US011336863B2

(12) United States Patent
Botto et al.

(10) Patent No.: US 11,336,863 B2
(45) Date of Patent: May 17, 2022

(54) SYSTEMS, METHODS, AND DEVICES FOR MANAGING A CALL ON A COMMUNICATION SYSTEM WITH AN EXTERNAL DISPLAY DEVICE

(71) Applicant: Meta Platforms, Inc., Menlo Park, CA (US)

(72) Inventors: Joao Miguel Botto, San Francisco, CA (US); Christian Lynn Flowers, Menlo Park, CA (US); Tomas Brennessl, San Francisco, CA (US); Jennifer Nicole Irturk, Foster City, CA (US); Elliott Poppel, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/984,886

(22) Filed: Aug. 4, 2020

(65) Prior Publication Data

US 2021/0136324 A1 May 6, 2021

Related U.S. Application Data

(60) Provisional application No. 62/930,550, filed on Nov. 4, 2019.

(51) Int. Cl.
*H04N 7/14* (2006.01)
*G06F 3/16* (2006.01)
*H04N 7/18* (2006.01)

(52) U.S. Cl.
CPC ............. *H04N 7/147* (2013.01); *G06F 3/167* (2013.01); *H04N 7/185* (2013.01)

(58) Field of Classification Search
None
See application file for complete search history.

(56) References Cited

U.S. PATENT DOCUMENTS

| 8,436,947 B2* | 5/2013 | Barry | H04N 21/42222 348/734 |
| 10,978,062 B1* | 4/2021 | Vanderschaegen | G06F 3/167 |

(Continued)

FOREIGN PATENT DOCUMENTS

WO WO 2018/130882 A1 7/2018

OTHER PUBLICATIONS

PCT International Search Report and Written Opinion, PCT Application No. PCT/US2020/054688, dated Jan. 27, 2021, 17 pages.

*Primary Examiner* — Stella L. Woo
(74) *Attorney, Agent, or Firm* — Fenwick & West LLP (57) ABSTRACT

A communication system receives a request to establish a call between the communication system and a remote client device. The communication system sends a command to a television connected to the communication system that instructs the television to turn on and set its input source. The communication system requests a state of the television from the television. In response to receiving a response from the television indicating that the television configured for video output from the communication system, the communication system outputs video and audio received from the remote client device to the television, activates a camera of the communication system, and transmits video and audio from the communication system to the remote client device.

24 Claims, 8 Drawing Sheets

(56) References Cited

U.S. PATENT DOCUMENTS

| | | | |
|---|---|---|---|
| 2007/0263085 A1* | 11/2007 | Marton | H04N 7/15 348/14.09 |
| 2010/0073455 A1* | 3/2010 | Iwabuchi | H04N 7/141 348/14.04 |
| 2011/0310796 A1 | 12/2011 | Um et al. | |
| 2012/0120184 A1 | 5/2012 | Fornell et al. | |
| 2014/0009609 A1* | 1/2014 | Webster | H04N 7/186 348/143 |
| 2017/0180899 A1* | 6/2017 | Proctor, Jr. | H04N 21/8106 |
| 2019/0159164 A1 | 5/2019 | Achamola et al. | |
| 2019/0273963 A1* | 9/2019 | Jobanputra | G10L 25/51 |

* cited by examiner

SYSTEMS, METHODS, AND DEVICES FOR MANAGING A CALL ON A COMMUNICATION SYSTEM WITH AN EXTERNAL DISPLAY DEVICE

CROSS REFERENCE TO RELATED APPLICATIONS

This application claims the benefit of U.S. Provisional Application No. 62/930,550, filed Nov. 4, 2019, which is incorporated by reference in its entirety.

BACKGROUND

Video calling allows users to communicating with one another in real-time. For example, a first user may use a client device to call the client device of a second user to initiate a video call. During the video call, the first user's client device receives video and audio signals via an internal camera and microphone and transmits the video and audio signals over a network to the second user's client device.

SUMMARY

This disclosure details a communication system that answer and facilitate a call via a television connected to the communication system.

The communication system may answer a call and output video and audio to a television if the television is on and connected to the communication system. In particular, the communication system receives a request to establish a call between the communication system and a remote client device via a network. For example, a user may initiate a call locally via the communication system or provide an input to answer an incoming call. The communication system receives a user input to answer the incoming call and sends a command to the television connected to the communication system. The command instructs the television to turn on and change the input source of the television to a port associated with the communication system.

The communication system answers the call. If the user input was entered via a remote control, the communication system facilities the call via the television by outputting, to the television, video and audio received by the network from the remote client device, activating a camera of the communication system to capture video, and transmitting, from the communication system, video and audio over the network to the remote client device. Otherwise, if the user input was a voice command, the communication system facilitates the call via internal speakers and does not immediately activate the camera of the communication system.

The communication system requests a state of the television from the television. In response to receiving a response from the television indicating that the television is on and the input source of the television is set to the port associated with the communication system, the communication system facilitates the call via the television. Otherwise, if the communication cannot confirm that the television is on and connected to the port associated with the communication system within a predefined time period, the communication system continues to facilitate the call via the internal speakers. For example, the communication system facilitates the call by using the internal microphone to capture local audio for transmission over the network and outputting audio received over the network via the speakers of the communication system.

In some embodiments, the communication system may continue to request, from the television, the state of the television intermittently throughout the call. In these embodiments, in response to determining that the input source of the television is not set to the port associated with the communication system, the communication system outputs the audio received by the network from the remote client device via speakers of the communication system. Further, in response to determining that the input source of the television is again set to the port associated with the communication system, the communication system outputs the audio received by the network from the remote client device to the television. In addition, in response determining that the television is off, the communication system ends the call.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
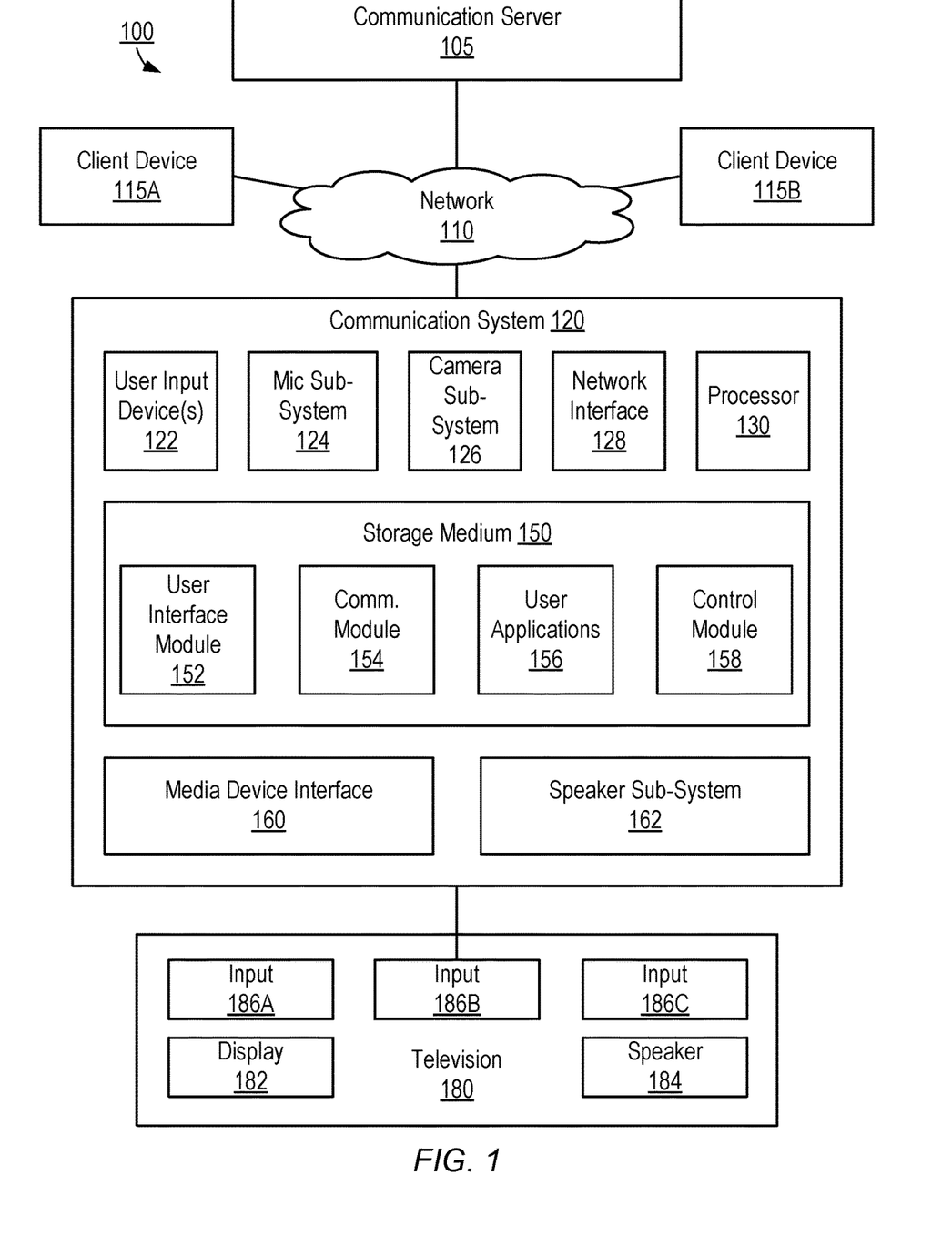
FIG. 1 is a block diagram of a system environment for a communication system, in accordance with an embodiment.

FIG. 1 is a block diagram of a system environment 100 for a communication system 120. The system environment 100 includes a communication server 105, one or more client devices 115 (e.g., client devices 115A, 115B), a network 110, and a communication system 120. In alternative configurations, different and/or additional components may be included in the system environment 100. For example, the system environment 100 may include additional client devices 115, additional communication servers 105, or additional communication systems 120.

In an embodiment, the communication system 120 comprises a computing device for coupling to an external media device such as a television or other external display and/or audio output system. In this embodiment, the communication system 120 may couple to the external media device via a wireless interface or wired interface (e.g., an HDMI cable) and may utilize various functions of the external media device such as its display, speakers, and input devices. Here, the communication system 120 may be configured to be compatible with a generic external media device that does not have specialized software, firmware, or hardware specifically for interacting with the communication system 120.

The client devices 115 are one or more computing devices capable of receiving user input as well as transmitting and/or receiving data via the network 110. In one embodiment, a client device 115 is a conventional computer system, such as a desktop or a laptop computer. Alternatively, a client device 115 may be a device having computer functionality, such as a personal digital assistant (PDA), a mobile telephone, a smartphone, a tablet, an Internet of Things (IoT) device, a video conferencing device, another instance of the communication system 120, or another suitable device. A client device 115 is configured to communicate via the network 110. In one embodiment, a client device 115 executes an application allowing a user of the client device 115 to interact with the communication system 120 by enabling voice calls, video calls, data sharing, or other interactions. For example, a client device 115 executes a browser application to enable interactions between the client device 115 and the communication system 105 via the network 110. In another embodiment, a client device 115 interacts with the communication system 105 through an application running on a native operating system of the client device 115, such as IOS® or ANDROID™.

The communication server 105 facilitates communications of the client devices 115 and the communication system 120 over the network 110. For example, the communication server 105 may facilitate connections between the communication system 120 and a client device 115 when a voice or video call is requested. Additionally, the communication server 105 may control access of the communication system 120 to various external applications or services available over the network 110. In an embodiment, the communication server 105 may provide updates to the communication system 120 when new versions of software or firmware become available. In other embodiments, various functions described below as being attributed to the communication system 120 can instead be performed entirely or in part on the communication server 105. For example, in some embodiments, various processing or storage tasks may be offloaded from the communication system 120 and instead performed on the communication server 120.

The network 110 may comprise any combination of local area and/or wide area networks, using wired and/or wireless communication systems. In one embodiment, the network 110 uses standard communications technologies and/or protocols. For example, the network 110 includes communication links using technologies such as Ethernet, 802.11 (WiFi), worldwide interoperability for microwave access (WiMAX), 3G, 4G, 5G, code division multiple access (CDMA), digital subscriber line (DSL), Bluetooth, Near Field Communication (NFC), Universal Serial Bus (USB), or any combination of protocols. In some embodiments, all or some of the communication links of the network 110 may be encrypted using any suitable technique or techniques.

The communication system 120 includes one or more user input devices 122, a microphone sub-system 124, a camera sub-system 126, a network interface 128, a processor 130, a storage medium 150, a media device interface 160, and a speaker sub-system 162. In other embodiments, the communication system 120 may include additional, fewer, or different components.

The user input device 122 comprises hardware that enables a user to interact with the communication system 120. The user input device 122 can comprise, for example, a touchscreen interface, a game controller, a keyboard, a mouse, a joystick, a voice command controller, a gesture recognition controller, a remote control receiver, or other input device. In an embodiment, the user input device 122 may include a remote control device that is physically separate from the user input device 122 and interacts with a remote controller receiver (e.g., an infrared (IR) or other wireless receiver) that may integrated with or otherwise connected to the communication system 120. In some embodiments, the user input device 122 is integrated with an internal display, such as in a touchscreen interface. In other embodiments, user inputs may be received over the network 110 from a client device 115. For example, an application executing on a client device 115 may send commands over the network 110 to control the communication system 120 based on user interactions with the client device 115. In other embodiments, the user input device 122 may include a port (e.g., an HDMI port) connected to an external television that enables user inputs to be received from the television responsive to user interactions with an input device of the television. For example, the television may send user input commands to the communication system 120 via a Consumer Electronics Control (CEC) protocol based on user inputs received by the television.

The microphone sub-system 124 comprises one or more microphones (or connections to external microphones) that capture ambient audio signals by converting sound into electrical signals that can be stored or processed by other components of the communication system 120. The captured audio signals may be transmitted to the client devices 115 during a voice/video call or in a voice/video message. Additionally, the captured audio signals may be processed to identify voice commands for controlling functions of the communication system 120. In an embodiment, the microphone sub-system 124 comprises one or more integrated microphones. Alternatively, the microphone sub-system 124 may comprise an external microphone coupled to the communication system 120 via a communication link (e.g., the network 110 or other direct communication link). The microphone sub-system 124 may comprise a single microphone or an array of microphones. In the case of a microphone array, the microphone sub-system 124 may process audio signals from multiple microphones to generate one or more beamformed audio channels each associated with a particular direction (or range of directions).

The camera sub-system 126 comprises one or more cameras (or connections to one or more external cameras) that captures images and/or video signals. The captured images or video may be sent to the client device 115 during a video call or in a multimedia message, or may be stored or processed by other components of the communication system 120. Furthermore, in an embodiment, images or video from the camera sub-system 126 may be processed to for face detection, face recognition, gesture recognition, or other information that may be utilized to control functions of the communication system 120. In an embodiment, the camera sub-system 126 includes one or more wide-angle cameras for capturing a wide, panoramic, or spherical field of view of a surrounding environment. The camera sub-system 126 may include integrated processing to stitch together images from multiple cameras, or to perform image processing functions such as zooming, panning, de-warping, or other functions. In an embodiment, the camera sub-system 126 may include multiple cameras positioned to capture stereoscopic (e.g., three-dimensional images) or may include a depth camera to capture depth values for pixels in the captured images or video.

The network interface 128 facilitates connection of the communication system 120 to the network 110. For example, the network interface 130 may include software and/or hardware that facilitates communication of voice, video, and/or other data signals with one or more client devices 115 to enable voice and video calls or other operation of various applications executing on the communication system 120. The network interface 128 may operate according to any conventional wired or wireless communication protocols that enable it to communication over the network 110.

The media device interface 160 comprises an interface to an electronic device for presenting images, video, and/or audio content. For example, the media device interface 160 comprises one or more ports (e.g., an HDMI port) that couple the communication system 120 to an external display device (e.g., a television) and/or external speakers. In an embodiment, the communication system 120 may comprise an integrated display in addition to the media device interface 160 connected to the external television 180 and the speaker sub-system 162. The external speakers may be integrated with the television or may comprise separate speakers. The communication system 120 also includes an internal speaker sub-system 162, which comprises one or more speakers that output audio signals.

The processor 130 operates in conjunction with the storage medium 150 (e.g., a non-transitory computer-readable storage medium) to carry out various functions attributed to the communication system 120 described herein. For example, the storage medium 150 may store one or more modules or applications (e.g., user interface 152, communication module 154, user applications 156, state detection module 158) embodied as instructions executable by the processor 130. The instructions, when executed by the processor, cause the processor 130 to carry out the functions attributed to the various modules or applications described herein. In an embodiment, the processor 130 may comprise a single processor or a multi-processor system.

In an embodiment, the storage medium 150 comprises a user interface module 152, a communication module 154, user applications, and state detection module 158. In alternative embodiments, the storage medium 150 may comprise different or additional components.

The user interface module 152 comprises visual and/or audio elements and controls for enabling user interaction with the communication system 120. For example, the user interface module 152 may receive inputs from the user input device 122 to enable the user to select various functions of the communication system 120. In an example embodiment, the user interface module 152 includes a calling interface to enable the communication system 120 to make or receive voice and/or video calls over the network 110. To make a call, the user interface module 152 may provide controls to enable a user to select one or more contacts for calling, to initiate the call, to control various functions during the call, and to end the call. To receive a call, the user interface module 152 may provide controls to enable a user to accept an incoming call, to control various functions during the call, and to end the call. For video calls, the user interface module 152 may include a video call interface that displays remote video from a client 115 together with various control elements such as volume control, an end call control, or various controls relating to how the received video is displayed or the received audio is outputted.

The user interface module 152 may furthermore enable a user to access user applications 156 or to control various settings of the communication system 120. In an embodiment, the user interface module 152 may enable customization of the user interface according to user preferences. Here, the user interface module 152 may store different preferences for different users of the communication system 120 and may adjust settings depending on the current user.

The communication module 154 facilitates communications of the communication system 120 with clients 115 for voice and/or video calls. For example, the communication module 154 may maintain a directory of contacts and facilitate connections to those contacts in response to commands from the user interface module 152 to initiate a call. Furthermore, the communication module 154 may receive indications of incoming calls and interact with the user interface module 152 to facilitate reception of the incoming call. The communication module 154 may furthermore process incoming and outgoing voice and/or video signals during calls to maintain a robust connection and to facilitate various in-call functions.

The user applications 156 comprise one or more applications that may be accessible by a user via the user interface module 152 to facilitate various functions of the communication system 120. For example, the user applications 156 may include a web browser for browsing web pages on the Internet, a picture viewer for viewing images, a media playback system for playing video or audio files, an intelligent virtual assistant for performing various tasks or services in response to user requests, or other applications for performing various functions. In an embodiment, the user applications 156 includes a social networking application that enables integration of the communication system 120 with a user's social networking account. Here, for example, the communication system 120 may obtain various information from the user's social networking account to facilitate a more personalized user experience. Furthermore, the communication system 120 can enable the user to directly interact with the social network by viewing or creating posts, accessing feeds, interacting with friends, etc. Additionally, based on the user preferences, the social networking application may facilitate retrieval of various alerts or notifications that may be of interest to the user relating to activity on the social network. In an embodiment, users may add or remove applications 156 to customize operation of the communication system 120.

The control module 158 controls other components of the communication system 120 to answer and facilitate calls between the communication system 120 and a remote client device 115. Further, the control module 158 communicates with the television 180 by sending commands to the television 180 to control the state of the television 180 and/or detect the state of the television 180. The control module 158 also takes actions with respect to calls between the communication system 120 and client devices 115 depending on a detected state of the television 180.

In an embodiment, the control module 158 controls the output of audio and video signals received via the network 110 from one or more client devices 115, and controls the capture and transmission of audio and video obtained locally by the communication system 120 based on a detected state of the television 180 during a call or when a call is being initiated or answered. In some embodiments, if the control module 158 cannot confirm that the television 180 is configured in a state that enables it to output a video call using the television 180, the control module 158 facilitates the call as an audio-only call using the speaker sub-system 162 of the communication system 120. For example, the control module 158 directs the audio signals received from the remote client device to the speaker sub-system 162 of the communication system 120 and captures audio using the microphone sub-system 124 for transmission over the network 110 to the remote client device 115. The control module 158 furthermore deactivates the local camera sub-system 126 so that no video is captured or transmitted in this state. If the control module 158 instead successfully verifies that the television 180 is on and set to the input source corresponding to the port of the communication system 120, the control module 158 facilitates the call as a video call using the external television 180. Particularly, the control module 158 directs the audio and video signals received over the network 110 to the connected television 180, activates the camera sub-system 126, and transmits captured audio and video the remote client device 115.

The control module 158 also sends commands to the television 180 to change a state of the television 180 in response to a call being initiated or received. For example, the control module 158 can send commands to turn on the television 180, to change the input source of the television 180 to correspond to a port associated with the communication system 120, or to request a state of the television (e.g., the on/off state of the television, the configured input source, or other information) to enable the control module 158 to determine if the commands were successfully executed. In an embodiment, the commands may be sent via a Consumer Electronics Control (CEC) protocol via an HDMI link.

In an embodiment, the control module 158 may intermittently send requests to the television 180 to obtain its state throughout a call at set time increments. In some embodiments, the control module 158 sends a request for the state of the television 180 if an external device or source has changed the state of the television 180. In other alternative embodiments, the control module 158 may detect a state of the television without necessarily communicating commands to the television 180. For example, the communication system 120 may acoustically detect the state of the television 180 by capturing ambient audio and comparing the captured audio to an audio signal send to the television 180, thereby enabling the communication system 120 to detect whether the television 180 is actually playing the outputted audio.

In some embodiments, the control module 158 takes action with respect to calls based on the detected state of the television 180. For example, in one embodiment, if the control module 158 detects that the television 180 is turned off during a call (or can otherwise not verify that the television 180 is still on), the control module 158 takes action to end the call. In other embodiments, if the control module 158 detects that the input source of the television 180 does not match the port of the communication system 120 during a call, the control module 158 may switch the audio for the call to the speaker sub-system 162 of the communication system 120 instead of outputting the audio to the speakers 184 of the television 180. Here, the communication system 120 may optionally continue to output video to the television 180 or may discontinue outputting video until the television is switched back to the correct input source.

In the system environment of FIG. 1, the communication system 120 connects to a television 180 for visual display and audio output. The television 180 includes a display 182, a speaker 184, and a plurality of input ports 186 (e.g., input port 186A, 186B, 186C). The television 180 may receive audio and video signals from the communication system via one of the input ports 186, output the audio signals using the speaker 184, and output video signals using the display 182. For example, the communication system 120 may interface with the television 180 for various purposes including conducting voice/video calls, displaying media content, and playing audio content, like music, podcasts, and alerts, among other functions. The input ports 186 may be wired ports such as a USB port, an HDMI port, an Ethernet port, etc. or wireless ports for communicating according to a wireless protocol such as Bluetooth, Wireless USB, Near Field Communication (NFC), etc. Different devices may be coupled to the television 180 via different ports 186. The television 180 can switch between different ports 186 as an input source to control which port 186 (and connected device) provides the audio and video signals to the television 180 for outputting.

The television 180 outputs audio and video signals based on its state (or internal settings) that includes a description of its input. For example, the television may output signals from the communication system when set to a HDMI1 and output signals from a cable provider when set to HDMI2.

Figure 2A:
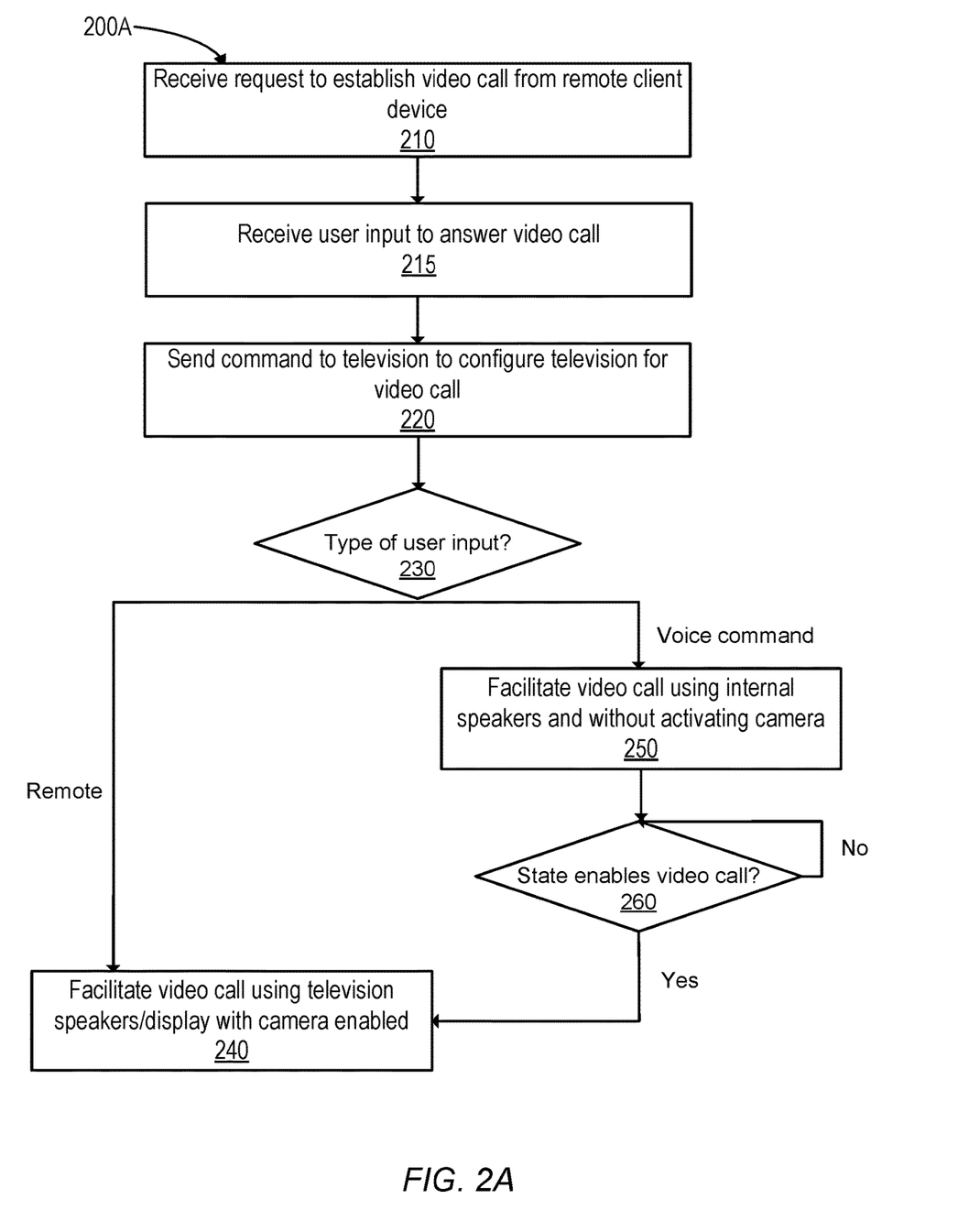
FIG. 2A is a flowchart illustrating a process for facilitating an incoming call using a communication system, according to one embodiment.

FIG. 2A is a flowchart illustrating a process 200A for facilitating an incoming call using a communication system 120, according to one embodiment. The communication system 120 receives 210 a request to establish an incoming video call between the communication system 120 and a remote client device 115 via a network 110. In some embodiments, the call may be another type of communication session facilitated by the communication system 120. The communication system 120 receives 215 a user input to answer the video call. For example, a user may send a command to cause the communication system 120 to answer an incoming call. The command may comprise, for example, a voice command that the communication system 120 detects using the microphone sub-system 124 or a command sent via an input device, such as a remote control connected to the television 180. The communication system 120 sends 220 a command to the television 180 to turn on and set the input source of the television 180 to a port associated with the communication system 120.

The communication system facilitates the video call based on the type of user input 230. If the user input was entered via a remote control, the communication system 120 assumes that the state of the television 180 would enable the video call and facilitates 240 the video call via the television 180. To facilitate 240 the video call, the communication system 120 outputs video and audio received by the network 110 from the remote client device 115 to the television 180. The communication system 180 also activates the camera sub-system 126 of the communication system 120 to capture video and transmits video and audio captured by the microphone sub-system 124 over the network 110 to the remote client device 115.

If the user input was a voice command, the communication system 120 facilitates 250 the video call initially using the speaker sub-system 162 of the communication system 120 without activating the camera sub-system 126. For example, the communication system 120 outputs the received network audio via the speaker sub-system 162 of the communication system 120 and transmits audio captured by the microphone sub-system 124 over the network 110 to the remote client device 115 without capturing and transmitting video.

The communication system 120 determines 260 whether a state of the television enables a video call. For example, the communication system 120 determines whether the television 180 is on or off and to which input source the television 180 is connected. For example, the communication system 120 may send a polling command to the television 180 to request its on/off state and input source setting. In response to determining that the state of the television enables it to facilitate a video call, the communication system facilitates 240 the video call using speakers 184 and display 182 of the television 180. For example, in an embodiment, the communication system 120 confirms the state of the television 180 by receiving a response from the television 180 that the television 180 is on and the input source of the television 180 is set to the port associated with the communication system 120.

In response to the communication system 120 being unable to determine 260 that the television 180 in the state that enables a video call, the communication system 120 continues to facilitate 250 the video call as using the speaker sub-system 162 of the communication system 120 without activating the camera sub-system 126. In an embodiment, the communication system 120 may continue to facilitate 250 the call without activating the local camera 126 either in response to affirmatively determining that the television is not configured appropriately (is either not on or not connected to the appropriate input source) or in response to the communication system 120 being unable to verify the state within a threshold amount of time of requesting the state. Further, in some embodiments, the user may configure the communication system 120 to opt out of video calls entirely. For example, the user may manually deactivate the camera sub-stem 126 and answer call with audio only.

Figure 2B:
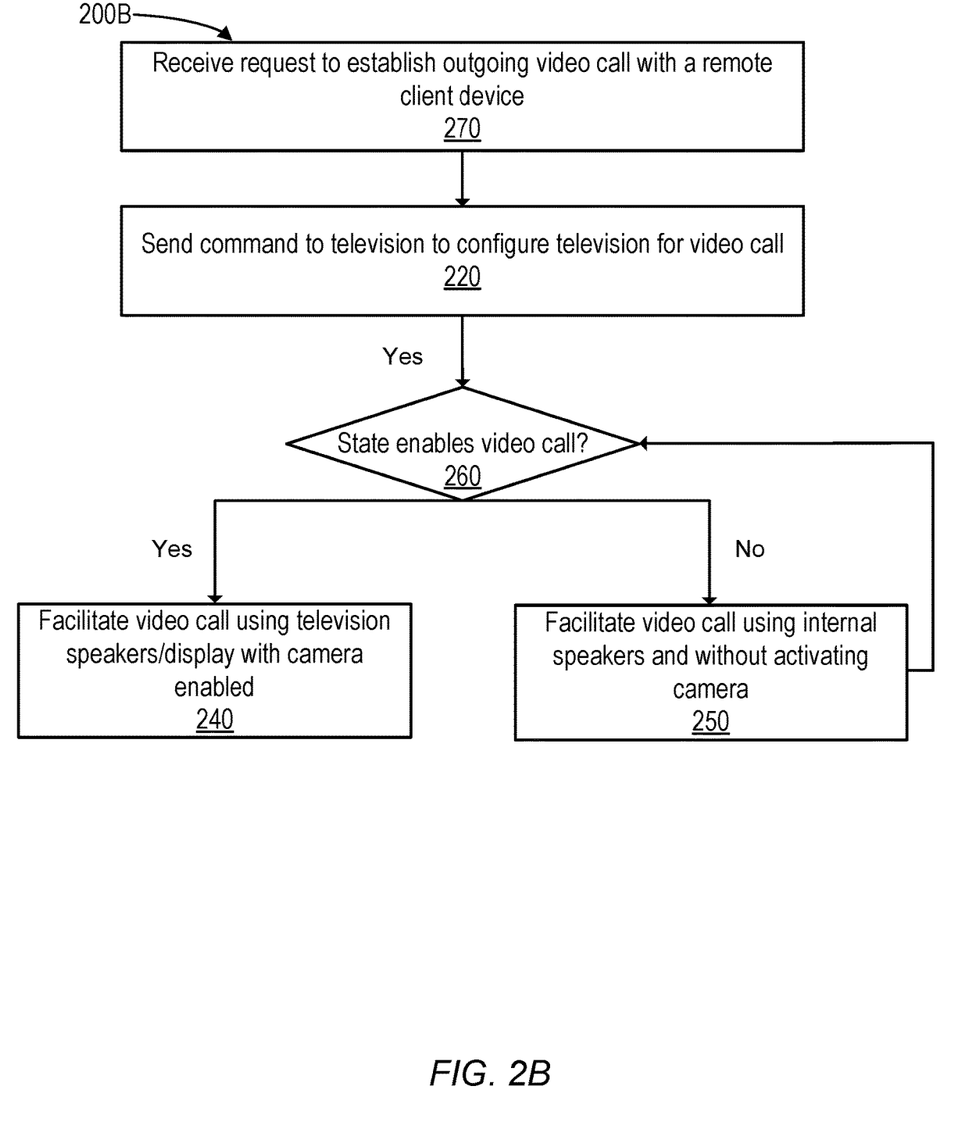
FIG. 2B is a flowchart illustrating a process 200 for facilitating an outgoing call using a communication system, according to one embodiment.

FIG. 2B is a flowchart illustrating a process 200B for facilitating an outgoing call using a communication system 120, according to one embodiment. The communication system 120 receives 270 a request to establish an outgoing video call with a remote client device 115 via a network 110. For example, a user may send a command to cause the communication system 120 to initiate a new outgoing call. The command may comprise, for example, a voice command that the communication system 120 detects using the microphone sub-system 124 or a command sent via an input device, such as a remote control connected to the television 180.

The communication system 120 sends 220 a command to the television 180 to turn on and set the input source of the television 180 to a port associated with the communication system 120. The communication system 120 determines 260 whether a state of the television enables a video call. If the state does enable video calls (i.e., the television 180 is on and the input source of the television 180 is set to the port associated with the communication system 120), the communication system 120 facilitates 240 the video call using the speakers 184 and display 182 of the television 180. In particular, the communication system 120 outputs video and audio received by the network 110 from the remote client device 115 to the television 180. The communication system 180 also activates the camera sub-system 126 of the communication system 120 to capture video and transmits video and audio captured by the microphone sub-system 124 over the network 110 to the remote client device 115.

If the state does not enable a video call (i.e., the television 180 is not on or the input source of the television 180 is not set to the port associated with the communication system 120), the communication system 120 facilities 250 the video call using the speaker sub-system 162 of the communication system 120 without activating the camera sub-system 126. The communication system 120 continues to determine 260 whether the state of the television 180 enable a video call. If the state does enable a video call, the communication system 120 switches to facilitating 240 the video call via the television 180, and if not, the communication system 120 continues to facilitate 250 the video call using the speaker sub-system 162 of the communication system 120 without activating the camera sub-system 126.

Figure 2C:
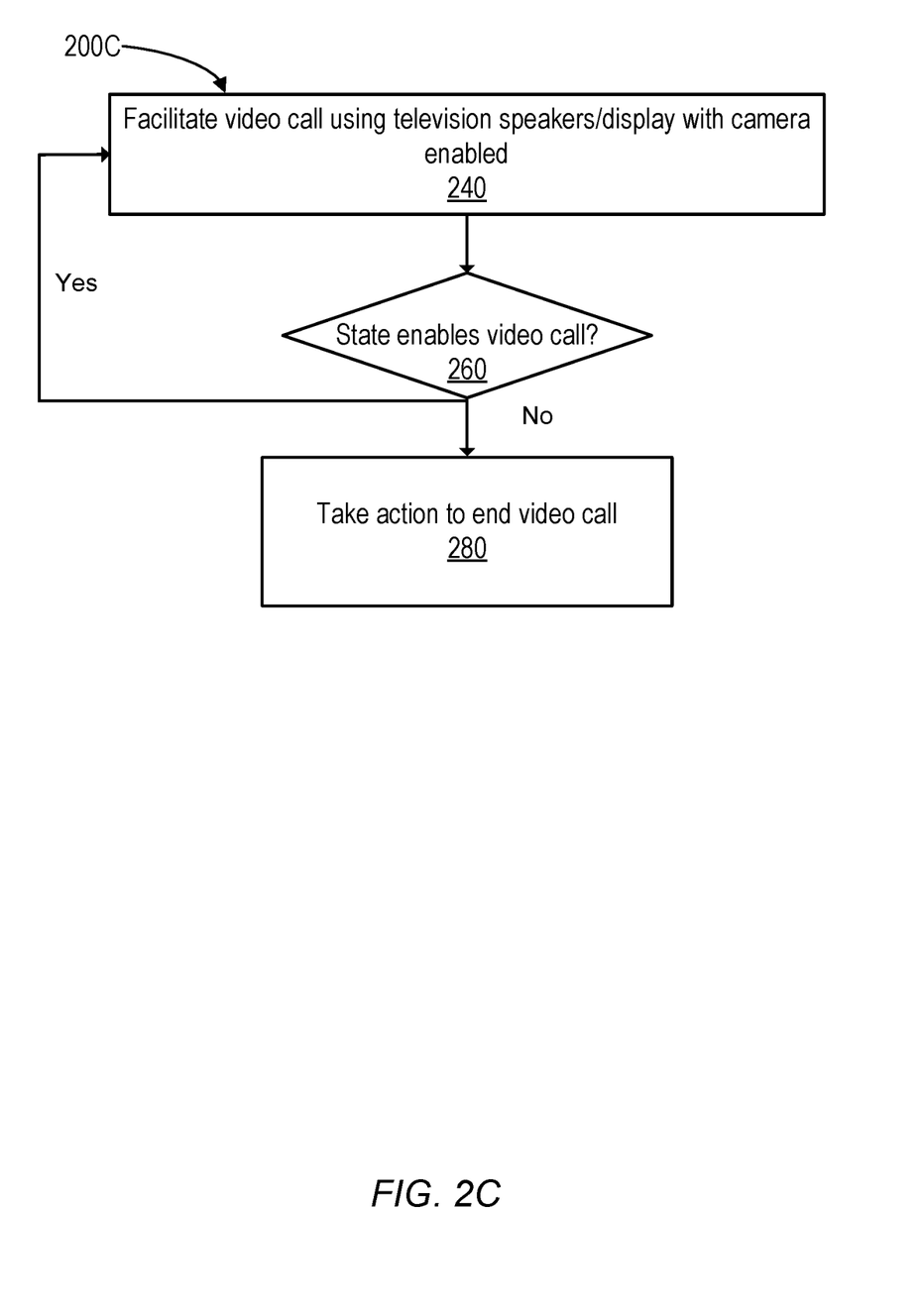
FIG. 2C is a flowchart illustrating a process 200C taking action to end a video call using a communication system 120, according to one embodiment.

FIG. 2C is a flowchart illustrating a process 200C taking action to end a video call using a communication system 120, according to one embodiment. This may be for an incoming video call as shown in FIG. 2A or an outgoing video call as shown in FIG. 2B. The communication system 120 requests the state of the television 180 intermittently throughout the call to determine 260 if the state enables a video call. If the communication system 120 determines that the television 180 is off or that the state otherwise does not enable a video call, the communication system 120 takes 280 action to end the call. Otherwise, the communication system 120 continues to facilitate 240 the video call via the television 180.

Further, if the communication system 120 does not receive a response from the television 180 within a threshold amount of time of requesting the state or otherwise cannot verify that the television 180 is still on, the communication system may take 280 action to end the call. If the communication system 120 determines that the television 180 has switched input sources, the communication system 120 outputs audio received by the network 110 from the remote client device 115 via the speaker sub-system 162 of the communication system 120 (instead of sending to the television 180) but may continue capturing local video via the camera sub-system 126 and transmitting the video to the remote client device 115. Subsequently, if the communication system 120 detects that the input source of the television 180 again corresponds to the port associated with the communication system 120, the communication system 120 returns to outputting the network audio from the remote client device 115 to the television 180.

Example Use Case

Figure 3A:
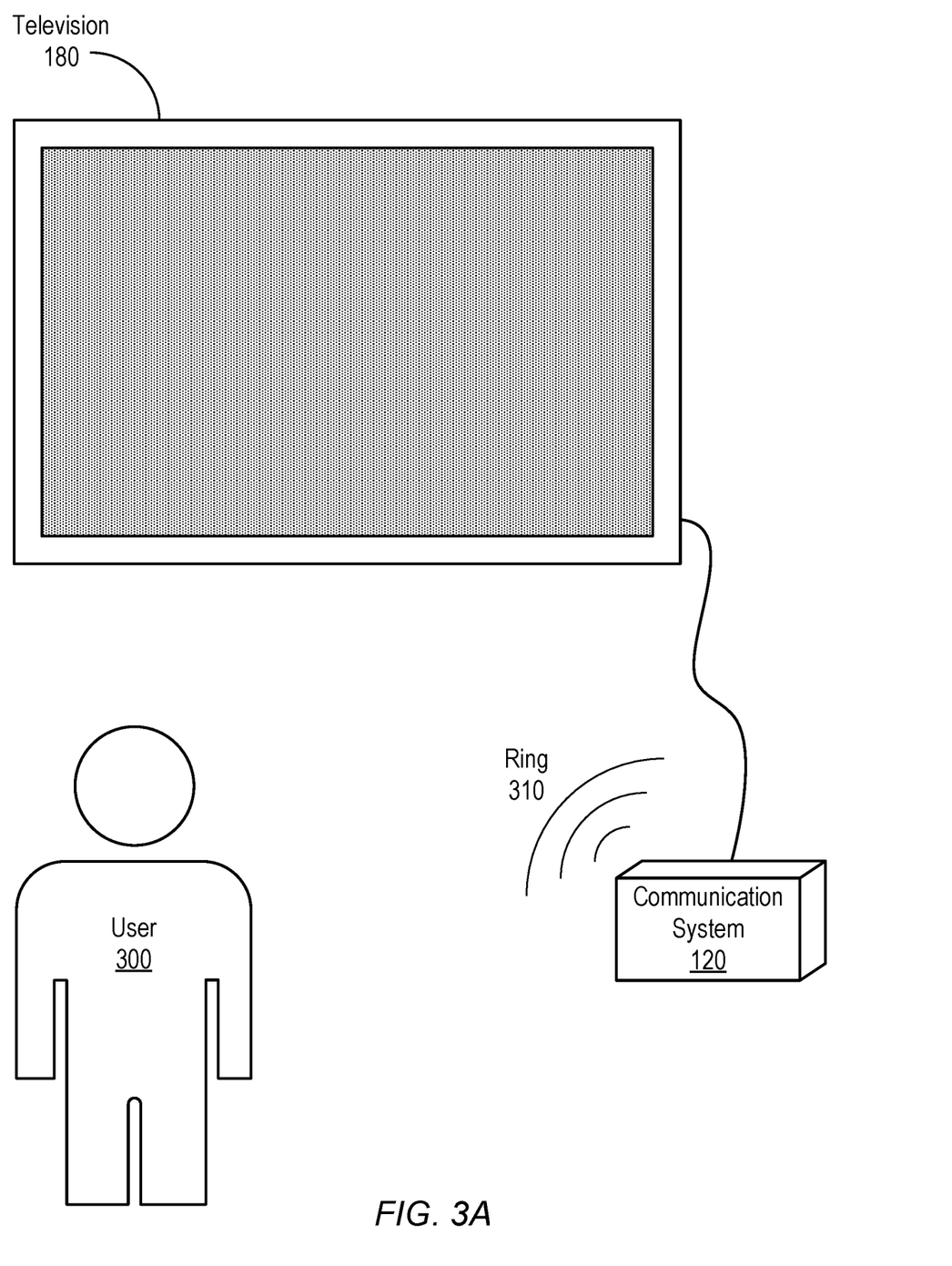
FIGS. 3A-3D illustrate an example use case scenario of using the communication system to answer a call via a television, according to one embodiment.
Figure 3B:
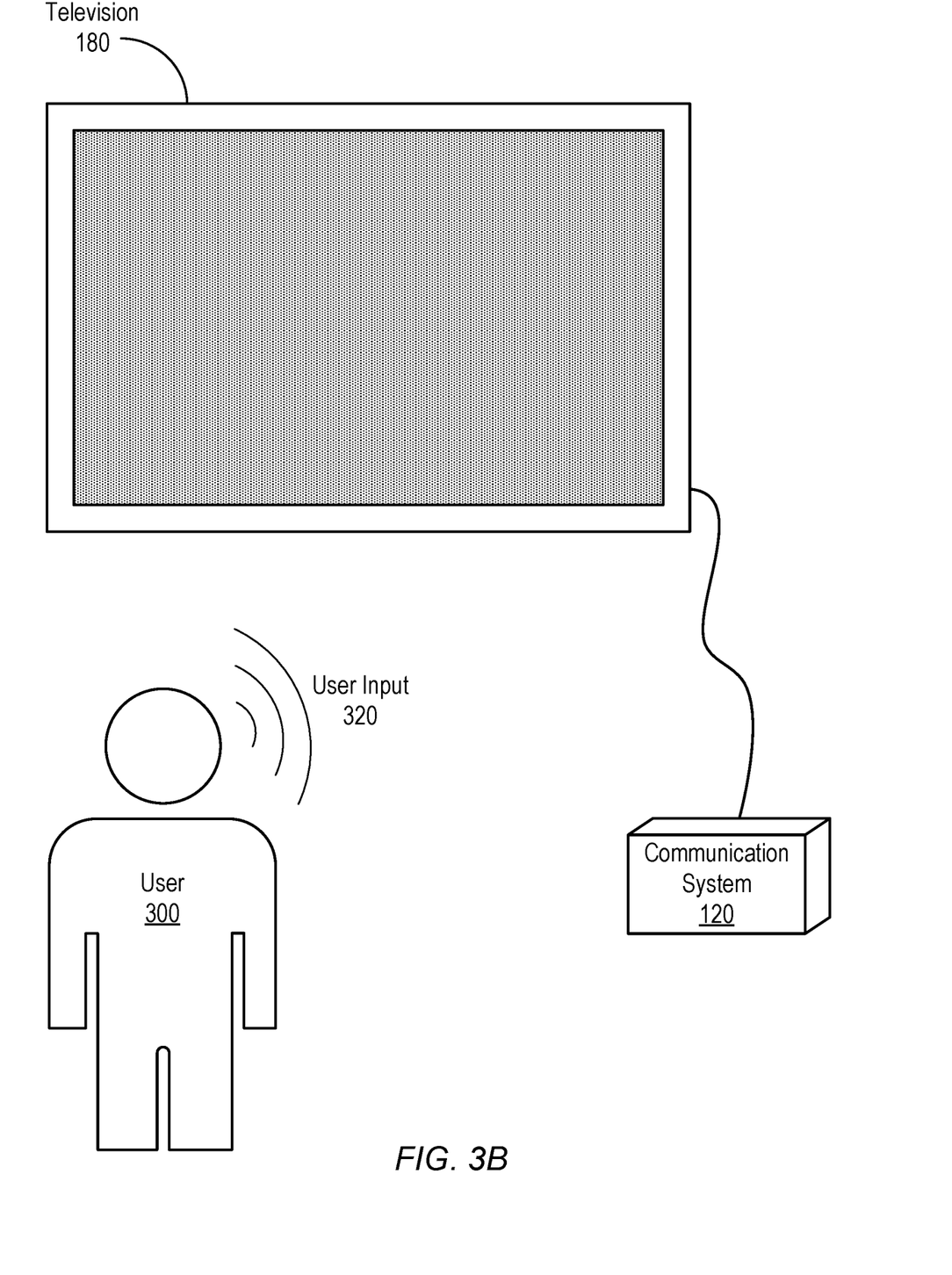

FIGS. 3A-3D illustrate an example use case scenario of using the communication system 120 to answer a call, according to one embodiment. In FIG. 3A, user 300 of a communication system 120 connected to a television 180 may receive or initiate a call via a communication system 120. In the case of an incoming call, the communication system 120 may ring 310 to signal to the user 300 that the call is incoming from a remote client device 115. As shown in FIG. 3B, the user 300 may send a user input 320 to the communication system 120 indicating a user intent to answer the call. The user input 320 may be a form of voice communication or another input to the communication system 120. The communication system 120 sends a command to the television 180 to turn on and set the input source to the port associated with the communication system 120.

Figure 3C:
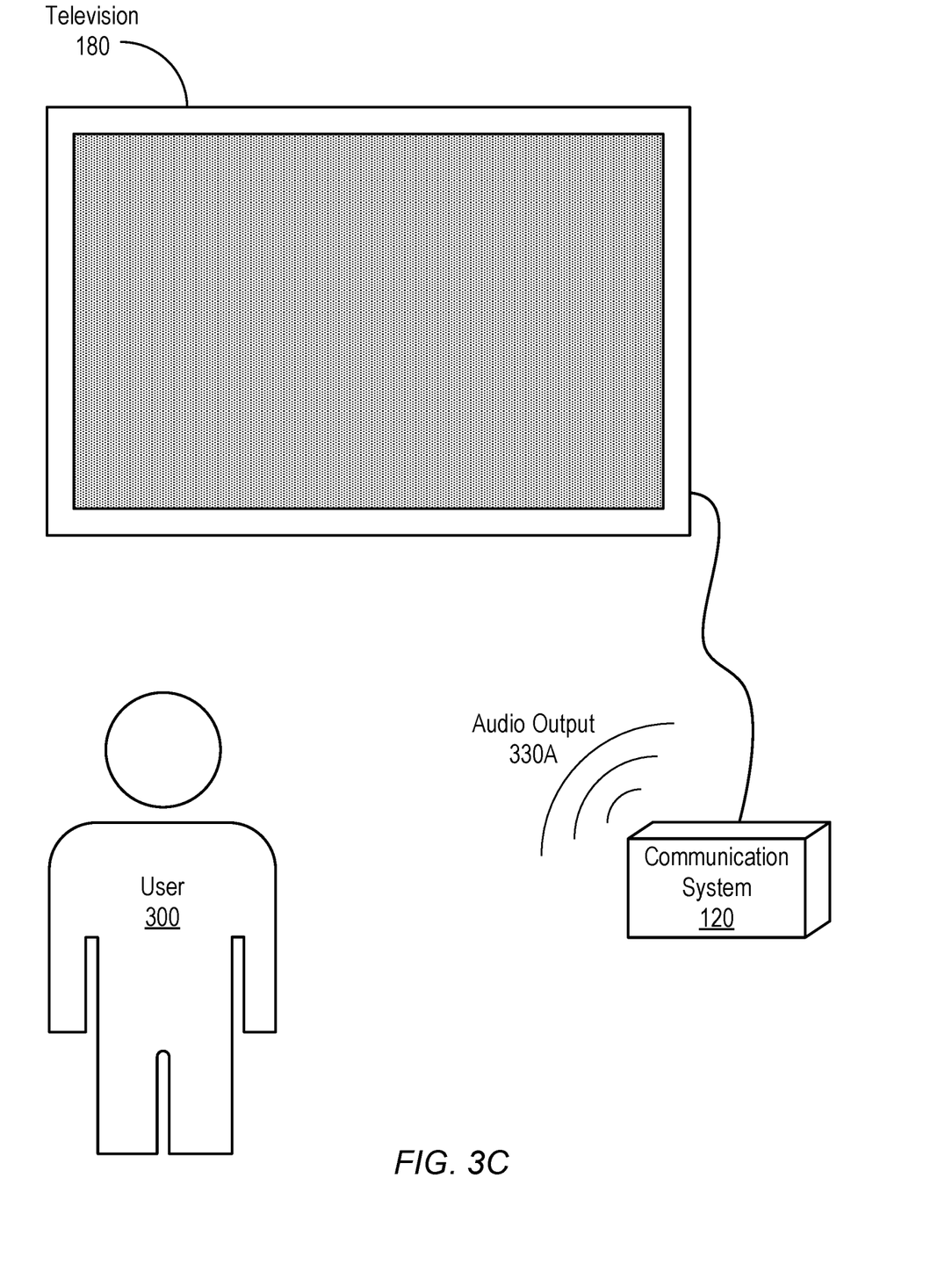
Figure 3D:
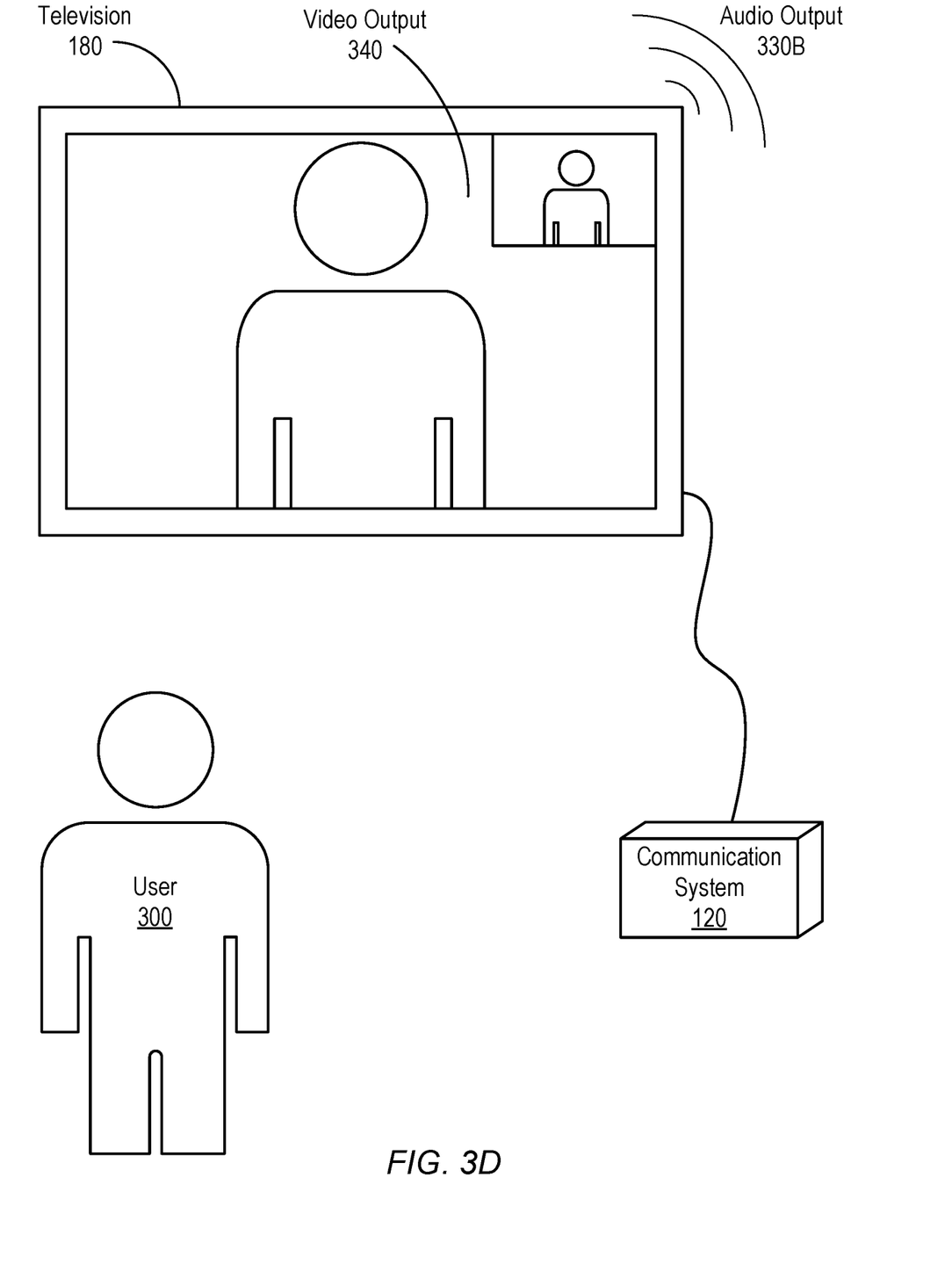

If the user input 320 was a voice command, the communication system 120 facilitates the call by outputting an audio output 330A for the call via the communication system without activating the camera sub-system 126, as shown in FIG. 3C. The communication system 120 requests the state of the television and if the communication system 120 cannot confirm that the television 180 is on and set to the appropriate input source, the communication system 120 continues to facilitate the call using speaker sub-system 162 and does not activate camera sub-system 126. If the communication system 120 has verified that the television 180 is on and set to the input source corresponding to the port associated with the communication system 120, the communication system outputs a video output 340 and the audio output 330B to the television 180, activates the camera sub-system 126, and transmits video and audio to the remote client device 115 via a network 110, as shown in FIG. 3D. Further, if the user input was entered via a remote control, the communication system 120 automatically facilitates the call via the television 180 with the camera sub-system 126 enabled, as shown in FIG. 3D.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving, at a communication device, a request to establish a call between the communication device and a remote client device via a network;
   sending a command to a television connected to the communication device, wherein the command instructs the television to turn on and change the input source of the television to a port associated with the communication device;
   requesting, from the television, a state of the television;
   in response to receiving a response from the television indicating that the television is on and the input source corresponds to the port of the communication device outputting, to the television, video and audio received by the network from the remote client device;
   activating a camera of the communication device to capture video; and
   transmitting, from the communication device, video and audio over the network to the remote client device.

2. The method of claim 1, further comprising:
   receiving a user input, wherein the user input is a voice command indicating to answer the call;
   outputting, via internal speakers of the communication device, audio received by the network from the remote client device;
   transmitting, from the communication device, audio over the network to the remote client device; and
   in response to receiving a response from the television indicating that the television is not configured for video output from the communication device, continuing to output, via internal speakers of the communication device, audio received by the network from the remote client device.

3. The method of claim 1, further comprising:
   in response to not receiving a response from the television indicating the state of the television within a threshold amount of time:
   outputting, via internal speakers of the communication device, audio received by the network from the remote client device; and
   transmitting, from the communication device, audio over the network to the remote client device.

4. The method of claim 1, further comprising:
   requesting, from the television, the state of the television intermittently throughout the call; and
   in response to receiving a response from the television indicating that the input source of the television is not set to the port associated with the communication device, outputting, via internal speakers of the communication device, the audio received by the network from the remote client device.

5. The method of claim 4, further comprising:
   in response to determining that the input source of the television is set to the port associated with the communication device, outputting, to the television, the audio received by the network from the remote client device.

6. The method of claim 1, further comprising:
   requesting, from the television, the state of the television intermittently throughout the call; and
   in response to receiving a response from the television indicating that the television is off, ending the call.

7. The method of claim 1, further comprising:
   responsive to receiving a user input entered via a remote control indicating to answer the call:
   outputting, to the television, video and audio received by the network from the remote client device;
   activating the camera of the communication device to capture video; and
   transmitting, from the communication device, video and audio over the network to the remote client device.

8. The method of claim 1, wherein the television is off or the input source of the television is not set to the port associated with the communication device when the television is not configured for video output from the communication device.

9. A non-transitory computer-readable storage medium storing executable instructions that, when executed by a communication device with a camera and speakers, cause the communication device to:
receive a request to establish a call between the communication device and a remote client device via a network;
send a command to a television connected to the communication device, wherein the command instructs the television to turn on and change the input source of the television to a port associated with the communication device;
request, from the television, a state of the television;
in response to receiving a response from the television indicating that the television is on and the input source corresponds to the port of the communication device
output, to the television, video and audio received by the network from the remote client device;
activate the camera to capture video; and
transmit video and audio over the network to the remote client device.

10. The non-transitory computer-readable storage medium of claim 9, wherein the instructions further cause the communication device to:
receive a user input, wherein the user input is a voice command indicating to answer the call;
output, via internal speakers of the communication device, audio received by the network from the remote client device;
transmit, from the communication device, audio over the network to the remote client device; and
in response to receiving a response from the television indicating that the television is not configured for video output from the communication device, continue to output, via internal speakers of the communication device, audio received by the network from the remote client device.

11. The non-transitory computer-readable storage medium of claim 10, wherein the television is off or the input source of the television is not set to the port associated with the communication device when the television is not configured for video output from the communication device.

12. The non-transitory computer-readable storage medium of claim 9, the wherein the instructions further cause the communication device to:
in response to not receiving a response from the television indicating the state of the television within a threshold amount of time:
output, via internal speakers of the communication device, audio received by the network from the remote client device; and
transmit, from the communication device, audio over the network to the remote client device.

13. The non-transitory computer-readable storage medium of claim 9, wherein the instructions further cause the communication device to:
request, from the television, the state of the television intermittently throughout the call; and
in response to receiving a response from the television indicating that input source of the television is not set to the port associated with the communication device, output, via internal speakers of the communication device, the audio received by the network from the remote client device.

14. The non-transitory computer-readable storage medium of claim 13, wherein the instructions further cause the communication device to:
in response to determining that the input source of the television is set to the port associated with the communication device, output, to the television, the audio received by the network from the remote client device.

15. The non-transitory computer-readable storage medium of claim 9, wherein the instructions further cause the communication device to:
request, from the television, the state of the television intermittently throughout the call; and
in response to receiving a response from the television indicating that the television is off, end the call.

16. The non-transitory computer-readable storage medium of claim 9, wherein the instructions further cause the communication device to:
responsive to receiving a user input entered via a remote control indicating to answer the call:
output, to the television, video and audio received by the network from the remote client device;
activate the camera of the communication device to capture video; and
transmit, from the communication device, video and audio over the network to the remote client device.

17. A communication device comprising:
at least one camera;
one or more speakers;
one or more processors; and
memory storing one or more programs which, when executed by the one or more processors, cause the communication device to:
receive a request to establish a call between the communication device and a remote client device via a network;
send a command to a television connected to the communication device, wherein the command instructs the television to turn on and change the input source of the television to a port associated with the communication device;
request, from the television, a state of the television;
in response to receiving a response from the television indicating that the television is on and the input source corresponds to the port of the communication:
output, to the television, video and audio received by the network from the remote client device;
activate the at least one camera to capture video; and
transmit video and audio over the network to the remote client device.

18. The communication device of claim 17, wherein the one or more programs, when executed by the one or more processors, further cause the communication device to:
receive a user input, wherein the user input is a voice command indicating to answer the call;
output, via internal speakers of the communication device, audio received by the network from the remote client device;
transmit, from the communication device, audio over the network to the remote client device; and
in response to receiving a response from the television indicating that the television is not configured for video output from the communication device, continuing to output, via internal speakers of the communication device, audio received by the network from the remote client device.

19. The computer system of claim 18, wherein the television is off or the input source of the television is not set to the port associated with the communication device when the television is not configured for video output from the communication device.

20. The communication device of claim 17, wherein the one or more programs, when executed by the one or more processors, further cause the communication device to:
in response to not receiving a response from the television indicating the state of the television within a threshold amount of time:
output, via internal speakers of the communication device, audio received by the network from the remote client device; and
transmit, from the communication device, audio over the network to the remote client device.

21. The communication device of claim 17, wherein the one or more programs, when executed by the one or more processors, further cause the communication device to:
request, from the television, the state of the television intermittently throughout the call; and
in response to determining that input source of the television is not set to the port associated with the communication device, output, via internal speakers of the communication device, the audio received by the network from the remote client device.

22. The communication device of claim 17, wherein the one or more programs, when executed by the one or more processors, further cause the communication device to:
in response to determining that the input source of the television is set to the port associated with the communication device, output, to the television, the audio received by the network from the remote client device.

23. The communication device of claim 22, wherein the one or more programs, when executed by the one or more processors, further cause the communication device to:
request, from the television, the state of the television intermittently throughout the call; and
in response to receiving a response from the television indicating that the television is off, end the call.

24. The computer system of claim 17, the one or more programs, when executed by the one or more processors, further cause the communication device to:
responsive to receiving a user input entered via a remote control indicating to answer the call:
output, to the television, video and audio received by the network from the remote client device;
activate a camera of the communication device to capture video; and
transmit, from the communication device, video and audio over the network to the remote client device.

* * * * *

UNITED STATES PATENT AND TRADEMARK OFFICE
CERTIFICATE OF CORRECTION

| | |
|---|---|
| PATENT NO. | : 11,336,863 B2 |
| APPLICATION NO. | : 16/984886 |
| DATED | : May 17, 2022 |
| INVENTOR(S) | : Joao Miguel Botto et al. |

It is certified that error appears in the above-identified patent and that said Letters Patent is hereby corrected as shown below:

On the Title Page

In Column 2, item (57), under Abstract, Line 8, delete "television configured" and insert -- television is configured --, therefor.

In the Claims

In Column 12, Claim 1, Line 7, delete "device" and insert -- device: --, therefor.

In Column 13, Claim 9, Line 22, delete "device" and insert -- device: --, therefor.

In Column 13, Claim 12, Line 50, delete "the wherein" and insert -- wherein --, therefor.

In Column 14, Claim 17, Line 49, delete "communication:" and insert -- communication device: --, therefor.

In Column 15, Claim 19, Line 4, delete "computer system" and insert -- communication device --, therefor.

In Column 16, Claim 24, Line 16, delete "computer system" and insert -- communication device --, therefor.

Signed and Sealed this
Second Day of January, 2024

Katherine Kelly Vidal
*Director of the United States Patent and Trademark Office*